United States Patent [19]

Engelmann et al.

[11] 4,235,641
[45] Nov. 25, 1980

[54] DYEING AGENT COMPOSITIONS BASED ON POLYPROPYLENE WAX

[75] Inventors: Manfred Engelmann; Karl Maier, both of Augsburg; Arno Spange, Eschborn; Bernd Dewald, Idstein; Hans-Joachim Lenz, Hofheim am Taunus; Wolfgang Teige, Kelkheim, all of Fed. Rep. of Germany

[73] Assignee: Hoechst Aktiengesellschaft, Frankfurt am Main, Fed. Rep. of Germany

[21] Appl. No.: 53,032

[22] Filed: Jun. 28, 1979

Related U.S. Application Data

[63] Continuation of Ser. No. 852,538, Nov. 17, 1977.

[30] Foreign Application Priority Data

Nov. 19, 1976 [DE] Fed. Rep. of Germany ....... 2652628

[51] Int. Cl.$^3$ ............................................. C08L 23/12

[52] U.S. Cl. .............................. 106/308 M; 106/272; 260/42.21

[58] Field of Search .......................... 106/308 M, 272; 260/42.46, 42.21

[56] References Cited

U.S. PATENT DOCUMENTS 3,767,444 10/1973 Zeisberger ...................... 106/308 M Primary Examiner—Jacqueline V. Howard
Attorney, Agent, or Firm—Curtis, Morris & Safford

[57] ABSTRACT

Preparations of insoluble colorants, especially pigments, are obtained by distributing the colorant in molten polypropylene wax having a viscosity of 0.5 to 5 Pa.s, determined at 170° C., and an isotactic proportion of 40 to 90% by weight. These preparations are easily dispersible in polyolefins and especially useful for dyeing polypropylene in the mass.

11 Claims, No Drawings

DYEING AGENT COMPOSITIONS BASED ON POLYPROPYLENE WAX

This is a continuation, of application Ser. No. 852,538, filed 11/17/77.

The present invention is related to the dispersion of dyeing agents, especially of pigments, in polymer compositions, especially polypropylene with the use of pigment carrier mixtures.

Pigment compositions which are suitable for dyeing thermoplastics are already known.

Such pigment carrier compositions may be prepared by the action of shearing forces on a mixture of color pigments with polyolefins at elevated temperatures. German Auslegeschrift No. 1,669,651 for example relates to the use of a mixture for preparing a pigment consisting of 10 to 25% of an organic pigment and 90 to 75% of a polyethylene, at least 50% of which are low-molecular polyethylene. However, the use of such compositions for dyeing shaped articles of polypropylene, especially sheets and filaments, comprises the disadvantage that the polyethylene wax, which is per se incompatible with the polypropylene, migrates to the surface and appears there as undesirable film.

The use of polypropylene for preparing pigment compositions has been described, too, in the past. German Pat. No. 1,239,093 for example relates to the use of mixtures of amorphous ethylene-propylene-block polymers with melt viscosities of from 5 to 300 Pa.s (5,000 to 300,000 cP) at 150° C. and low-molecular crystalline polypropylene or a crystalline polymer of an α- monoolefin different from propylene being polymerized into polypropylene.

German Offenlegungsschrift No. 15,44,830 describes the use of amorphous homopolymers or copolymers of propylene, butene, hexene or propylene-ethylene-block copolymers. The viscosities of these polymers range also from 5 to 300 Pa.s (5,000–300,000 cP), especially from 10 to 200 Pa.s (10,000 to 200,000 cP) at 150° C.

The preparation of these amorphous polypropylenes is comparatively costly and complicated, since additionally to the polymerization there is also to be carried out an extraction, in order to obtain these polypropylenes. In case of mixtures of several carrier materials, the additional process of preparing the further components and the mixture is also required.

The mechanical properties of isotactic polypropylene are detrimentally affected by incorporating larger quantities of amorphous polypropylene. For that reason, most of the amorphous portions are extracted upon preparing isotactic polypropylene.

It has been found, that the dispersion of dyeing agents, especially of pigments, in polymer compositions, especially in polypropylene, can be carried out in a particularly simple and advantageous manner by using compositions consisting of a mixture of dyeing agent and polypropylene wax and wherein the polypropylene wax has a viscosity of 0.5 to 5 Pa.s (500 to 5,000 cP) at 170° C., preferably 1 to 5 Pa.s (1,000 to 5,000 cP) at 170° C. and an isotactic portion of 40 to 90, preferably from 50 to 80% by weight.

The suitability of this system is rather surprising, since generally, as mentioned above polypropylenes of considerably higher viscosity or complicated multicomponent-systems have to be used in order to achieve an accordingly good distribution of the dyeing agents in the compositions.

In this respect a special advantage resides in the fact that the mixing operation may be carried out with a comparatively low energy supply according to the lower viscosities, respectively the machinery to be used may be rather simple.

Another essential advantage may be seen in that such low-viscosity carrier materials are very well suited to spray granulation, thus enabling to blend beforehand polymer powder with solid dyeing agents, especially a pigment powder, possibly with addition of stabilizers or antioxidants, and to realize in that manner an unusually good initial distribution that is especially advantageous when such compositions are prepared continuously.

As dyeing agents there may be used dyestuffs, but preferably organic or inorganic pigments such as titanium dioxide, cadmium yellow, carbon black, phthalocyanine pigments, azo pigments, perylene derivatives and quinacridone derivatives and mixtures thereof.

The concentration of the dyeing agents may vary preferably from 20 to 70% by weight, it may be up to 80% by weight.

In analogy to the publications by H. P. Luongo, J. Appl. Polym. Sci. 3, 302 (1960) and R. H. Hughes, J. Appl. Polym. Sci. 13, 417 (1969) the isotactic portion of the polypropylene wax used according to the invention may be determined by infrared analysis based on the ratio of the extinctions of the peaks at 10.0 $\mu$m and 10.3 $\mu$m. The density at 25° C. is about 0.87–0.89.

Polypropylene waxes with these properties may be prepared e.g. by polymerizing propylene in solution with the use of special Ziegler catalysts such as they are described in German Offenlegungsschrift No. 2,329,641.

The dyeing agent compositions may be prepared according to various known methods:

Suitable apparatuses for discontinuous operation are the mixers and kneaders usually employed for that purpose. Thus it is possible, for example, to premix melt and knead in a sigma-shaped bladekneader the starting components: dyeing agents, polypropylene wax and optionally further additives, such as wetting agents and antioxidants. The dyeing agent may as well be incorporated in the pre-molten polypropylene wax, and kneading may be continued until the distribution is flawless.

The following operational method is preferred: The polypropylene wax is molten and applied onto the dyeing agent filled beforehand into the sigma-shaped bladekneader. Kneading is then started until the dyeing agent is comminuted in the polypropylene wax.

The dyeing agents composition may also be prepared, of course, by means of suitable single-screw and double-screw extruders for continuous operation and by screw kneaders (e.g. "Buss-Kokneter") or double screw kneaders with helically arranged blades (Werner & Pfleiderer), which may stand as examples for others. When using these continuously operating apparatuses, the dyeing agent compositions may possibly be granulated directly, either by cutting the hot strand immediately after the dye or strainer (breaker) blade or by inserting the strand into water.

The dyeing agent compositions obtained according to the invention may be present as powders, flakes or granules; they are highly suitable for dyeing polymer compositions, especially of polypropylene. The sheets and filaments which are dyed with the novel dyeing agent compositions excel upon the use of pigments by a very good pigment comminution. The pigment compositions prepared with the aforedescribed polypropylene waxes have an excellent fluidity, so that a homogeneous distribution of the pigment composition is achieved in a simple manner during the work-up, even when small amounts of pigments are added.

An additional advantage of the novel pigment compositions resides in the fact that the carrier material does not migrate to the surface during thermal after-treatment processes (stretching, fixation, texturizing and needling), in contradistinction to pigment compositions based on polyethylene wax.

The following Examples illustrate the invention. The parts mentioned therein are parts by weight and the percentages are percent by weight, unless otherwise stated. The temperatures are indicated in Centigrades (degrees Celsius).

Preparation of the catalysts 171 g of magnesium ethylate were suspended in 1,000 ml of Diesel oil and then 330 ml of titanium tetrachloride added dropwise at 85° C. This suspension was then agitated for one hour and the solid matter subsequently freed from soluble titanium compounds by multiple decantation and further addition of Diesel oil.

Approximately 20% of the originally added titanium were fixed onto the solid matter.

Preparation of polypropylene wax A 15 l of Diesel oil (boiling range 140°–160°) were filled into a 50 l vessel equipped with impeller agitator, and propylene was fed in until the pressure was 4.5 bar. Then hydrogen was fed in until the pressure was 5 bar. After heating to 120° a mixture of the aforedescribed catalyst (30 mmols, calculated on fixed titanium) with 30 mmols of aluminum diethyl monochloride and 120 mmols of aluminum triethyl, diluted with 2 l of Diesel oil, were added in such a way that the pressure and the composition of the gas remained constant in the gas chamber of the reactor, if the gas fed in at a constant rate (4 kg of propylene and about 60 l of hydrogen per hour). The reaction was terminated after several hours by adding a small quantity of water, and the catalysts and the solvent were separated.

The thus formed wax had a melt viscosity of 1.2 Pa.s (1200 cP), determined at 170°. 72% of the wax was crystalline (according to IR analysis). The density was 0.89 at 20°.

Preparation of polypropylene wax B

The process was the same as above described, with the following exceptions:

instead of 0.5 bar of hydrogen, the hydrogen pressure was 0.3 bar only and the catalyst mixture consisted of 100 mmols of aluminum triethyl, 20 mmols of aluminum diethyl monochloride and 50 mmols of the above described catalyst. The thus obtained wax had a melt viscosity of 4 Pa.s (4000 cP) at 170° and a density of 0.88; 55% was crystalline.

EXAMPLE 1

2,200 parts of the diazo compound Pigment Yellow 83 (C.I. No. 21,108) were introduced beforehand into a 20 l volume, coolable sigma-shaped blade kneader (manufacturer: Werner & Pfleiderer). While kneading, there were poured onto this pre-charged pigment 3,300 parts of polypropylene wax B (molten and heated to 200° prior to its application). Kneading was then continued for another hour, the temperature of the mixture being slowly adjusted to 130° by cooling the kneader. The thus obtained pigment composition is comminuted to a granule after cooling.

EXAMPLE 2

When replacing the yellow pigment used in Example 1 by Pigment Red 149 (C.I. No. 71,137) and polypropylene wax B by polypropylene wax A, while the rest of the operational process is identical, a corresponding pigment composition is obtained which is easily dispersible.

EXAMPLE 3

4,200 parts of the cadmium yellow Pigment Yellow 37 (C.I. No. 77,199) were filled beforehand into a 20 l volume coolable sigma-shaped blade kneader (manufacturer: Werner & Pfleiderer). On that pigment there were poured while kneading 2,800 parts of polypropylene wax B (which was molten and heated to 200° prior to its application). Kneading was then continued for another 45 minutes, while the temperature of the mass to be kneaded was slowly cooled to 130°. The composition was comminuted to a granule after cooling.

The thus obtained pigment composition was also suitable, among other purposes, for dyeing injection molded parts. For that specific purpose it is recommended to extend this highly concentrated composition to a concentration rate suitable for work-up, so as to guarantee an even distribution, with a natural-colored polymer, e.g. with polypropylene wax or with polypropylene or polyethylene.

EXAMPLE 4

The composition, which was obtained as described in Example 1, was introduced into the feed hopper of a continuous-scales-for-dosing-device, from where the composition was conducted to the feed zone of a double screw extruder at a rate of 2.5%, calculated on the fiber-forming polymer; said extruder was fed with an isotactic polypropylene having a melt index of 45 (MFI 230/5 g/10 min.).

At the end of the extruder the molten, pigmented polymer melt was pressed through a spinneret at a temperature of 275° by means of gear pumps, the plate having 24 holes with an internal width of 150 μm; the freshly spun filaments were then taken off by two godets at a speed of 1250 m/min and finally rolled up on cylindrical bobbins.

After having stretched the spin filament, a filament yarn with a titer of 72 dtex (consisting of 24 individual filaments) was obtained, having a tenacity of 5.2 g/den (47 Rkm) and an elongation at break of 27% that excels by an intensely reddish yellow color shade with extraordinary fastness properties in textiles.

An examination of the filament cross sections under the microscope shows that the pigment particles are evenly distributed over the entire cross section of the filaments. The average particle size in the stretched filament yarn corresponds to the average particle size in the initial composition.

After submitting the thus pigmented filament yarn to a thermosetting process for 10 minutes at 130°, an examination under the microscope does not show any carrier particles migrated to the filament surface, in contradistinction to the corresponding dyeing processes with commercially available pigment concentrates e.g. based on a commercially available polyethylene wax.

EXAMPLE 5

2% of the pigment concentrate obtained according to Example 2 were added to a polypropylene with a melt index of 8 (MFI 230/5 g/10 min.) by means of a slowly rotating mixer. The mixture was subsequently worked up to a 100 μm thick flat sheet, on an extruder equipped with a slot die, at a temperature of 250°.

The thus obtained sheet was homogeneous and had an intense color shade.

EXAMPLE 6

1.5% of the pigment concentrate obtained according to Example 3 were added to a polypropylene (injection molded type) having a melt index of 8 (MFI 230/5 g/10 min.), by means of a slowly rotating mixer, then worked up to yield shaped articles on an injection molding machine, at 270°.

There were obtained homogeneous shaped articles having an intense yellow color shade and corresponding fastness properties.

We claim:

1. A preparation of an insoluble colorant consisting essentially of an insoluble colorant distributed in an effective amount of a polypropylene wax having at 170° C. a viscosity of 0.5 to 5 Pa.s and an isotactic proportion of 40 to 90% by weight.

2. The preparation as claimed in claim 1, wherein the colorant is a pigment.

3. The preparation as claimed in claim 1, wherein the viscosity range of the polypropylene wax is 1 to 5 Pa.s.

4. The preparation as claimed in claim 1, wherein the isotactic proportion of the polypropylene wax is 50 to 80% by weight.

5. The preparation as claimed in claim 1, wherein the amount of colorant is up to 80% by weight.

6. The preparation as claimed in claim 1, wherein the amount of colorant is 20 to 70% by weight.

7. The preparation as claimed in claim 2, consisting essentially of about 20 to 70% by weight of the pigment and of about 30 to 80% by weight of said polypropylene wax.

8. A process for manufacturing a preparation as claimed in claim 1, which comprises distributing the colorant in the molten polypropylene wax.

9. A process for dyeing polyolefins in the mass which comprises dispersing in the polyolefin a preparation as claimed in claim 1.

10. The process as claimed in claim 9, wherein the polyolefin is polypropylene.

11. The preparation as claimed in any one of claims 1 to 7 wherein said preparation consists of an effective amount of the polypropylene wax and the insoluble colorant.

* * * * *